INVENTOR
CHARLES O. LARSON
BY Moore, Prangley & Clayton
ATTORNEYS

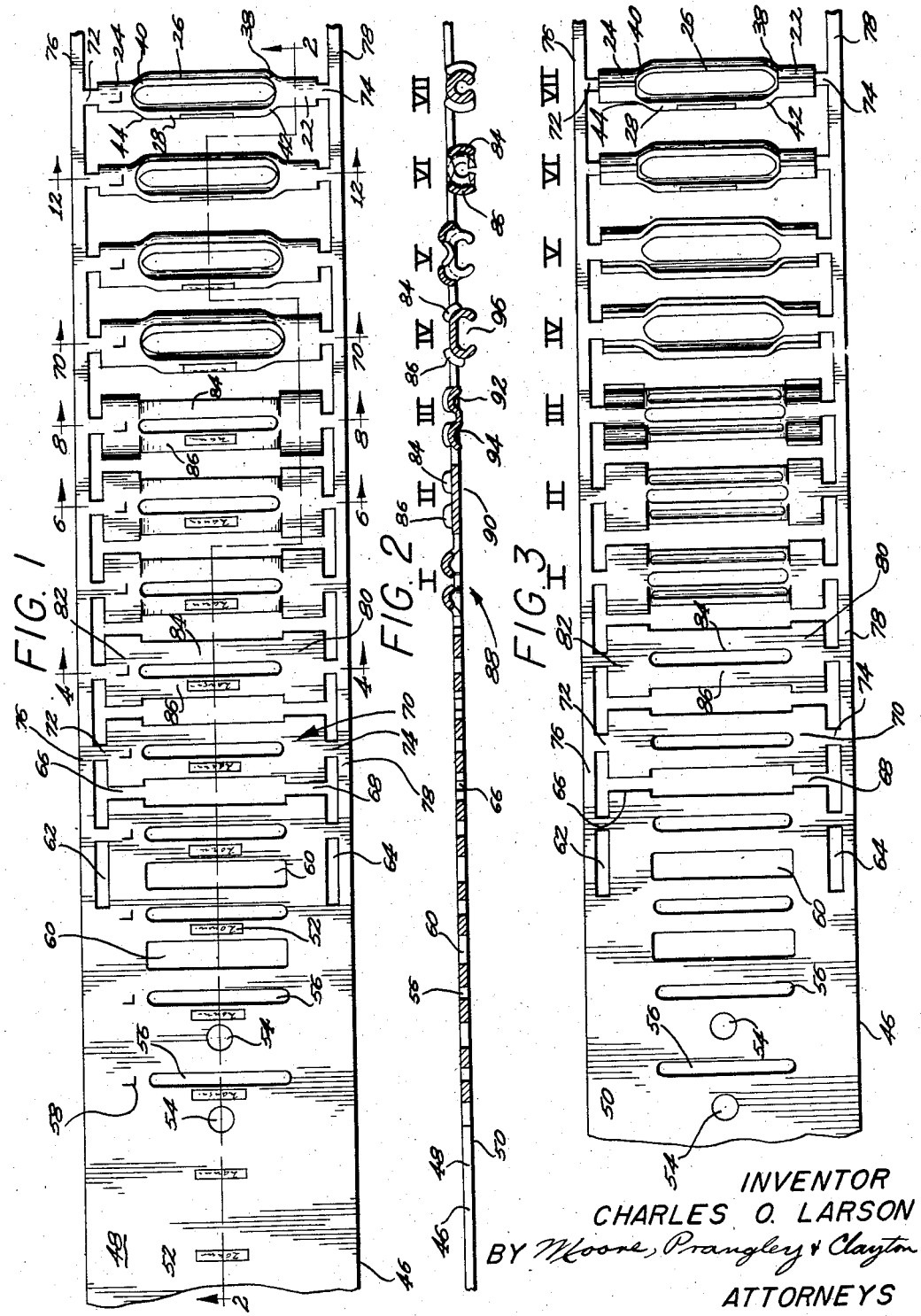
April 14, 1959    C. O. LARSON    2,881,510
TURNBUCKLE AND METHOD OF FORMING THE SAME
Filed July 8, 1954    2 Sheets-Sheet 1
INVENTOR
CHARLES O. LARSON
BY Moore, Prangley & Clayton
ATTORNEYS April 14, 1959   C. O. LARSON   2,881,510
TURNBUCKLE AND METHOD OF FORMING THE SAME
Filed July 8, 1954   2 Sheets-Sheet 2

United States Patent Office 2,881,510
Patented Apr. 14, 1959

2,881,510
TURNBUCKLE AND METHOD OF FORMING THE SAME

Charles O. Larson, Sterling, Ill.

Application July 8, 1954, Serial No. 442,157

1 Claim. (Cl. 29—175)

This invention relates to turnbuckles and more particularly to a turnbuckle and a method of making a turnbuckle made from sheet material.

An important object of the present invention is to provide an improved turnbuckle made of sheet material and particularly a sheet metal turnbuckle which is stronger in structure and more satisfactory in use.

Another object of the invention is to provide a sheet metal turnbuckle in which the threaded ends or necks are formed from sheet metal bent into cylindrical form without any special means to hold the ends in cylindrical form.

Yet another object of the invention is to provide a sheet metal turnbuckle of the type set forth which is proportioned so that no special structures need be added thereto to keep the turnbuckle in working condition and in shape when heavy loads are applied thereto.

A further object of the invention is to provide an improved method for forming a turnbuckle of the type set forth from sheet metal.

These and other objects and advantages of the invention will be better understood from the following description when taken in conjunction with the accompanying drawings. In the drawings wherein like reference numerals have been utilized to designate like parts throughout:

Fig. 1 is a plan view of one side of a sheet metal strip illustrating the method of producing the turnbuckle of the present invention by progressive stamping and die forming operations;

Fig. 2 is a view in section of the metal strip illustrated in Fig. 1 substantially as seen in the direction of the arrows along the line 2—2 of Fig. 1;

Fig. 3 is a plan view of the other side of the sheet metal strip shown in Fig. 1;

Figure 14:
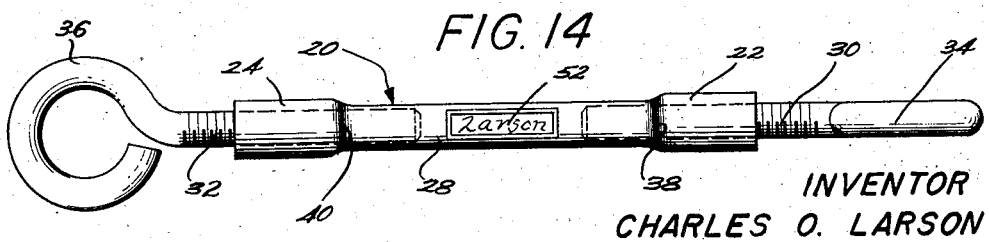
Fig. 14 is a view of the finished turnbuckle made according to the present invention.

The form of the turnbuckle made according to the principles of the present invention is best shown in Fig. 14. The turnbuckle is generally designated by the numeral 20 and includes two substantially cylindrical ends 22 and 24 which are connected by two straps 26 and 28 to form the completed turnbuckle 20. Each of the ends 22 and 24 is substantially cylindrical throughout the major portion thereof and has a length about one and one half times its diameter. The inner surface of each end 22 and 24 is threaded to receive an externally threaded shank 30 and 32, respectively. End 22 and shank 30 are preferably provided with left hand threads and end 24 and shank 32 are preferably provided with right hand threads. The outer ends of the threaded shanks 30 and 32 are provided with some form of attachment portion such as the eyes 34 and 36, respectively.

Figure 4:
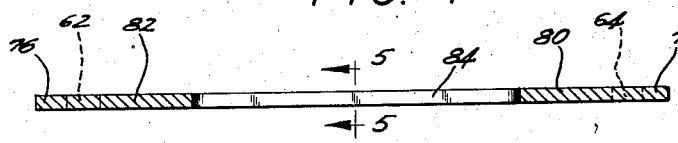
Fig. 4 is an enlarged view in section through the strip of Fig. 1 illustrating the structure of the strip at an initial stage of the progressive formation of the turnbuckle, no die forming operations having been performed at this point.
Figure 5:
Fig. 5 is a partial view in section as seen in the direction of the arrows along the line 5—5 of Fig. 4.
Figure 6:
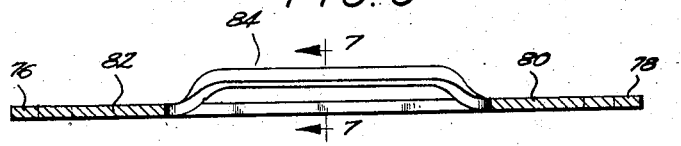
Fig. 6 is a view in section showing the shape of the turnbuckle blank after the second die forming operation substantially as seen in the direction of the arrows along the line 6—6 of Fig. 1.
Figure 7:
Fig. 7 is a partial view in section of the turnbuckle blank illustrated in Fig. 6 substantially as seen in the direction of the arrows along the line 7—7 of Fig. 6.
Figure 8:
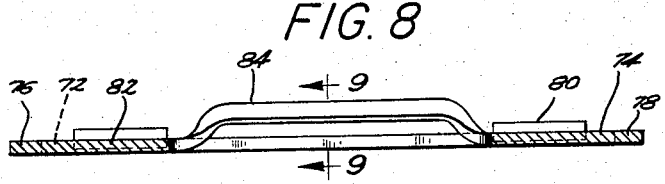
Fig. 8 is a partial view in section showing the turnbuckle blank after the third die forming step as seen along the line 8—8 of Fig. 1.
Figure 9:
Fig. 9 is a partial view in vertical section of the blank illustrated in Fig. 8 as seen in the direction of the arrows along the line 9—9 of Fig. 8.
Figure 10:
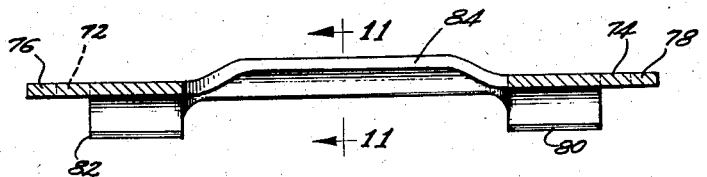
Fig. 10 is a view in section of the blank after the fourth die forming step substantially as seen in the direction of the arrows along the line 10—10 of Fig. 1.
Figure 11:
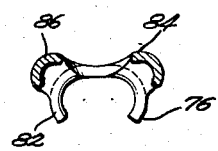
Fig. 11 is a view in vertical section through the blank of Fig. 10 as seen in the direction of the arrows along the line 11—11 of Fig. 10.
Figure 12:
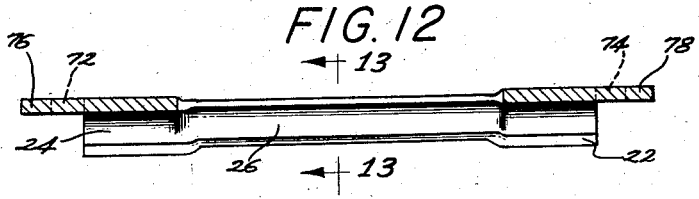
Fig. 12 is a view of the turnbuckle blank after the sixth die forming step substantially as seen in the direction of the arrows along the line 12—12 of Fig. 1.
Figure 13:
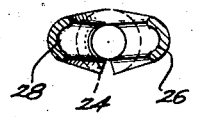
Fig. 13 is a partial view in vertical section substantially as seen in the direction of the arrows along the line 13—13 of Fig. 12.

Each of the straps 26 and 28 is substantially narrower than the ends 22 and 24 and is straight throughout the major portion of the length thereof. The ends of the straps are joined to the ends 22 and 24 by concavely curved connecting portions. More specifically strap 26 is connected to end 22 by connecting portion 38 and to end 24 by connecting portion 40 while strap 28 is connected to end 22 by connecting portion 42 and to end 24 by connecting portion 44. Each of the straps is curved in transverse cross section as is best seen in Fig. 13 and is curved to a radius smaller than the curvature of the ends 22 and 24 to impart strength and rigidity thereto.

An important feature of the present invention resides in the fact that the ends 22 and 24 are cylindrically folded until the free edges thereof meet and no special means is provided for holding ends 22 and 24 in the folded position. The ends made according to the present invention are sufficiently strong as illustrated to withstand the maximum pulling force which can be exerted in a longitudinal axial manner by forces applied to eyes 34 and 36. More specifically it has been found by actual tests that the turnbuckle of the present invention can withstand forces and retain its operative shape when forces are applied thereto sufficient to open eyes 34 and 36.

It is believed that this unusual strength and rigidity of the turnbuckle 20 results from the relative dimensions of the material from which the turnbuckle is formed of the ends 22 and 24 and of the straps 26 and 28 and the relative proportions and sizes among these various members.

In a specific example a turnbuckle made according to the present invention is made from sheet metal such as brass or steel having a thickness of 1/16 inch. The diameter of the rod from which threaded shanks 30 and 32 are to be formed would be 3/32 of an inch. The sheet material is then shaped to provide ends 22 and 24 having a maximum circular diameter of 1/4 inch and having a length of approximately 3/8 inch. The greatest transverse dimension of the straps 26 and 28 is 3/16 inch. It will be seen that the ratio of the length of each end to the diameter of each end is 1.5. In other words, each neck is substantially longer than its diameter.

Each of the connecting straps 26 and 28 has a maximum transverse dimension substantially less than the diameter of the ends 22 and 24 and in addition is curved in a transverse direction to a radius substantially smaller than the distance of the strap from the longitudinal axis of the turnbuckle.

Referring now to Figs. 1 through 13 of the drawings, there is shown a new and preferred method of forming turnbuckle 20 from a strip of sheet metal. A suitable strip of sheet metal generally designated by the numeral 46 which is made from steel or brass is provided. Sheet metal strip 46 may be 1/16 inch thick and have a width of 2 3/8 inches. A series of stamping and punching operations are first performed on the strip to produce a blank and the blank is thereafter subjected to a series of die forming operations to shape the blank into a finished turnbuckle. Figs. 1 and 3 show the appearance of the strip as viewed on a first side 48 and a second side 50, respectively.

Referring first to Fig. 1 the first stamping and cutting operation imprints a name or other identifying indicia 52. A guide hole 54 and an elongated substantially rectangular slot 56 is next cut in strip 46. At the same time a second identifying mark designated by the numeral 58 may be imprinted upon the strip. Aperture 54 serves as a guide for the succeeding punching and die forming operations to orient the strip 46 with respect to the dies. Rectangular slot 56 is eventually deformed to provide one of the spaces between spaced apart straps 26 and 28.

A second and substantially larger rectangular slot 60 is then stamped in the metal strip 46, this slot later serving to separate partially two adjacent turnbuckle blanks. There then is formed a pair of spaced apart rectangular slots 62 and 64 having the longest dimension thereof disposed along the length of strip 46, these slots later defining the outer ends of the turnbuckle ends 22 and 24.

A subsequent stamping operation cuts out a piece of metal to form a pair of connecting slots 66 and 68 which connect slots 62 and 64, respectively, to the larger rectangular slot 60.

At this stage of the formation a turnbuckle blank generally designated by the numeral 70 first emerges. The blank 70 is connected by a pair of neck portions 72 and 74 to a pair of parallel supporting strips 76 and 78 extending the length of metal strip 46. Supporting strips 76 and 78 serve to hold and support the blank 70 during subsequent forming operations, the strips 76 and 78 and connecting portions 72 and 74 eventually being removed from the completed turnbuckle.

The blank 70, at this stage of the formation of the turnbuckle, has a pair of end portions 80 and 82 which are eventually formed into turnbuckle ends 22 and 24, respectively. End portions 80 and 82 are connected by strap portions 84 and 86 which are eventually formed into straps 26 and 28.

The first die forming operation performed on blank 70 is performed at the point indicated by the numeral 88 and Roman numeral I and can be best seen in Figs. 2 and 3. This first die forming operation serves to impart a transverse curvature to strap portions 84 and 86 and also deforms the strap portions upwardly above the plane of surface 48. The second die forming operation generally designated by the numeral 90 and Roman numeral II similarly and further deforms strap portions 84 and 86.

The next and third die forming operation begins curvature of the end portions 80 and 82 as at 92 and 94, respectively (see Fig. 2), the outer edges and the central portions of end portions 80 and 82 being deformed downwardly below the plane of side 50 as viewed in Fig. 2. The fourth die forming operation further curves end portions 80 and 82 as is generally designated by the numeral 96 and begins to spread apart the curved strap portions 84 and 86. In this die forming step the major portions of ends 80 and 82 are bent downwardly and below the plane of side 50 as viewed in Fig. 2. The fifth and sixth die forming operations further continue the curving of end portions 80 and 82 and further spread the strap portions 84 and 86 apart until they are disposed apart 180 degrees. In the sixth die forming stage the turnbuckle is nearly completed. The seventh die forming stage completes the shaping of the turnbuckle but the turnbuckle is still connected to the side connecting strips 76 and 78 by connecting portions 72 and 74. The last operation is to sever the points at which turnbuckle end 22 connects with portion 74 and the point where turnbuckle end 24 connects with portion 72. This final severing operation produces a finished turnbuckle.

The various die forming operations have been designated by Roman numerals in Figs. 1, 2 and 3.

After the shaped turnbuckle is severed from connecting portions 72 and 74, the ends 22 and 24 are threaded so that they can receive the threaded shanks 30 and 32. The turnbuckle is now ready for use or sale without any further operations.

It will be seen that there has been provided a turnbuckle and a method of making turnbuckles which fulfill the objects and advantages set forth above. A specific example of the dimensions of a typical turnbuckle have been given for purposes of illustration but it is to be understood that other sizes of turnbuckles can be made according to the present invention provided that the relationship among the dimensions be retained substantially as set forth. It is obvious that changes and modifications can be made in the invention without departing from the spirit and scope thereof. Accordingly the invention is to be limited only as set forth in the following claim.

I claim:

The method of forming turnbuckles from an elongated strip of sheet material comprising the steps of removing portions of said strip successively to provide a plurality of turnbuckle blanks extending transversely with respect to the longitudinal axis of said strip and connected at each end to an elongated connecting strip, each turnbuckle blank including a pair of end portions connected by a pair of strap portions, each end portion having a pair of parallel longitudinally extending edges, next shaping said strap portions in a direction transversely to the length thereof to impart curvature thereto and to displace said strap portions out of the plane of said elongated strip in one direction, thereafter shaping each end portion into a pair of interconnected part-circular portions having the pairs of longitudinally extending edges thereof lying in substantially the same plane and disposed out of the plane of said elongated strip in a second direction opposite to said first direction, thereafter moving said part-circular portions toward each other in said second direction and moving said strap portions toward said second direction, next forming said part-circular end portions into cylindrical form disposed out of the plane of said elongated strip in said second direction and moving said strap portions past the plane of said elongated strip in said second direction, and thereafter severing the formed turnbuckle from the connecting strips.

References Cited in the file of this patent

UNITED STATES PATENTS

| 390,992 | Stillman | Oct. 9, 1888 |
| 2,004,555 | Klienmann et al. | June 11, 1935 |

FOREIGN PATENTS

| 393,315 | Great Britain | June 22, 1933 |
| 418,604 | Great Britain | Oct. 29, 1934 |
| 497,263 | France | Sept. 8, 1919 |